United States Patent [19]

Stoltenberg

[11] Patent Number: 5,226,269
[45] Date of Patent: Jul. 13, 1993

[54] APPARATUS AND METHOD FOR AUTOMATICALLY BALING LOOSE FIBROUS MATERIAL

[75] Inventor: Ronald F. Stoltenberg, Jamestown, N. Dak.

[73] Assignee: Haybuster Manufacturing Inc., Jamestown, N. Dak.

[21] Appl. No.: 887,708

[22] Filed: May 22, 1992

[51] Int. Cl.$^5$ ............ B65B 1/24; B65B 1/26; B65B 9/06
[52] U.S. Cl. ............ 53/436; 53/433; 53/450; 53/511; 53/528; 53/550
[58] Field of Search .......... 53/528, 529, 527, 436, 53/439, 450, 433, 432, 550, 511, 510, 523

[56] References Cited

U.S. PATENT DOCUMENTS

| 2,747,346 | 5/1956 | Tigerman et al. | 53/450 |
| 3,974,912 | 8/1976 | Buisson | 53/529 X |
| 4,640,082 | 2/1987 | Gill | 53/528 X |

Primary Examiner—James F. Coan
Attorney, Agent, or Firm—Kinney & Lange

[57] ABSTRACT

An apparatus and method for automatically compressing and packaging loose fiber material. The fibrous material compressed in the bale tube to form a bale while a tube of bale overwrap material is being formed. The doors to the base overwrap material is being formed. The doors to the base tube open to allow the compressed material to be pushed out of the bale tube by the piston. The base overwrap material is then cut, sealed at the ends of the bale, and cooled at desired locations.

17 Claims, 10 Drawing Sheets

APPARATUS AND METHOD FOR AUTOMATICALLY BALING LOOSE FIBROUS MATERIAL

BACKGROUND OF THE INVENTION

The present invention relates to the automatic baling of insulation. In particular, the invention is an apparatus and method for automatically baling loose fill treated cellulose fiber insulation.

The use of manual balers to bale insulation has been known. U.S. Pat. No. 4,108,063 discloses a hydraulic bagging press where an operator must manually put on a preformed bag and take the bag off when full. In U.S. Pat. No. 4,108,063, insulation material is fed into a horizontal chamber and compressed by a piston into a bag. The manual baler, as described in this patent, and which the assignee of the present invention has been utilizing, requires two persons per machine. In contrast, the present invention requires only one person for two machines. This results in large savings in labor, while the production output per baler is maintained. There is also a savings in operating costs by using a continuous sheeting of material for forming bags as opposed to the preformed bags.

Machines that form, fill, and seal packages are also known. These machines use a continuous web of material or film to enclose a succession of spaced packages wherein the film is sealed along a longitudinal seam so as to form a continuous tube around the packages. Transverse seals are then made across the film. The transverse seals separate the individual packages. An example of this type of machine is disclosed in U.S. Pat. Nos. 4,532,753 and 4,999,974 which are both assigned to the same assignee. These patents disclose a vertical form, fill, and seal apparatus wherein the fill material is dropped into a formed tube and then sealed and cut. The present invention utilizes a horizontal bale tube surrounded by a baling material with a piston to compress fibrous material metered into the bale tube. The bale tube has doors to support the baling material during compression, and has an air escape valve to prevent the baling material from bursting during compression.

In U.S. Pat. Nos. 4,722,168 and RE 30,010, there is disclosed a motor to help the dispensing of the continuous sheet of bale enclosing material or film. In U.S. Pat. No. 3,113,409, a method to expel excess air in the formed package is disclosed. The method utilizes a blase of air in a direction opposite that of package travel, to create a suction which draws the air out of and end of the package where a sealed seam is then made.

In the present invention, excess air is expelled during compression to prevent the bag from bursting. Air and particles are also drawn away from the seal to provide a clean surface for effective bonding or sealing.

SUMMARY OF THE INVENTION

The invention comprises both an apparatus and a method for automatically baling and bagging or wrapping loose insulation. In operation, a thermal plastic sheet is fed from a supply roll through a tensioner and around tube forming doors which lead to a bale tube. The edges of the plastic sheet overlap on a lower surface of the bale tube. The edge portions are then sealed together to create a continuous, plastic sheet tube, which surrounds and can be slid along the bale tube. Initially the end of the plastic tube is sealed over an open outlet end of the bale tube to form a plastic end panel to the interior of openable doors to enclose insulation compressed in the interior of the tube. A piston then pushes insulation into the partially formed bag of overwrap. While the piston is compressing the insulation in the partially formed bag, air is being expelled through an air passage to prevent the plastic tube from bursting and to keep the area of future sealing clean.

The bale tube doors are then opened, and the piston is extended further for pushing both the plastic tube and the compressed charge of insulation out of the bale tube and onto a conveyor system. When a trigger switch is activated, the conveyor reverses its direction slightly, allowing an unfilled part of the plastic tube to slacken and fold slightly between the bale of insulation and the bale tube doors. The plastic tube is then clamped across the trailing end of the bale of insulation, cut, heated and cooled in this unfilled region to form a sealed bale overwrap. The plastic tube is first slit or cut transversely and then the end seam is welded together. While the cutting and sealing is going on, the bag loading compression piston is returned to its home position, and the overlapping edge of the plastic film under the bale tube is being sealed to create the plastic tube for the next bale.

BRIEF DESCRIPTION OF THE DRAWINGS

FIG. 11 is an enlarged side view of the cutting means.

DETAILED DESCRIPTION OF THE PREFERRED EMBODIMENTS

Figure 1:
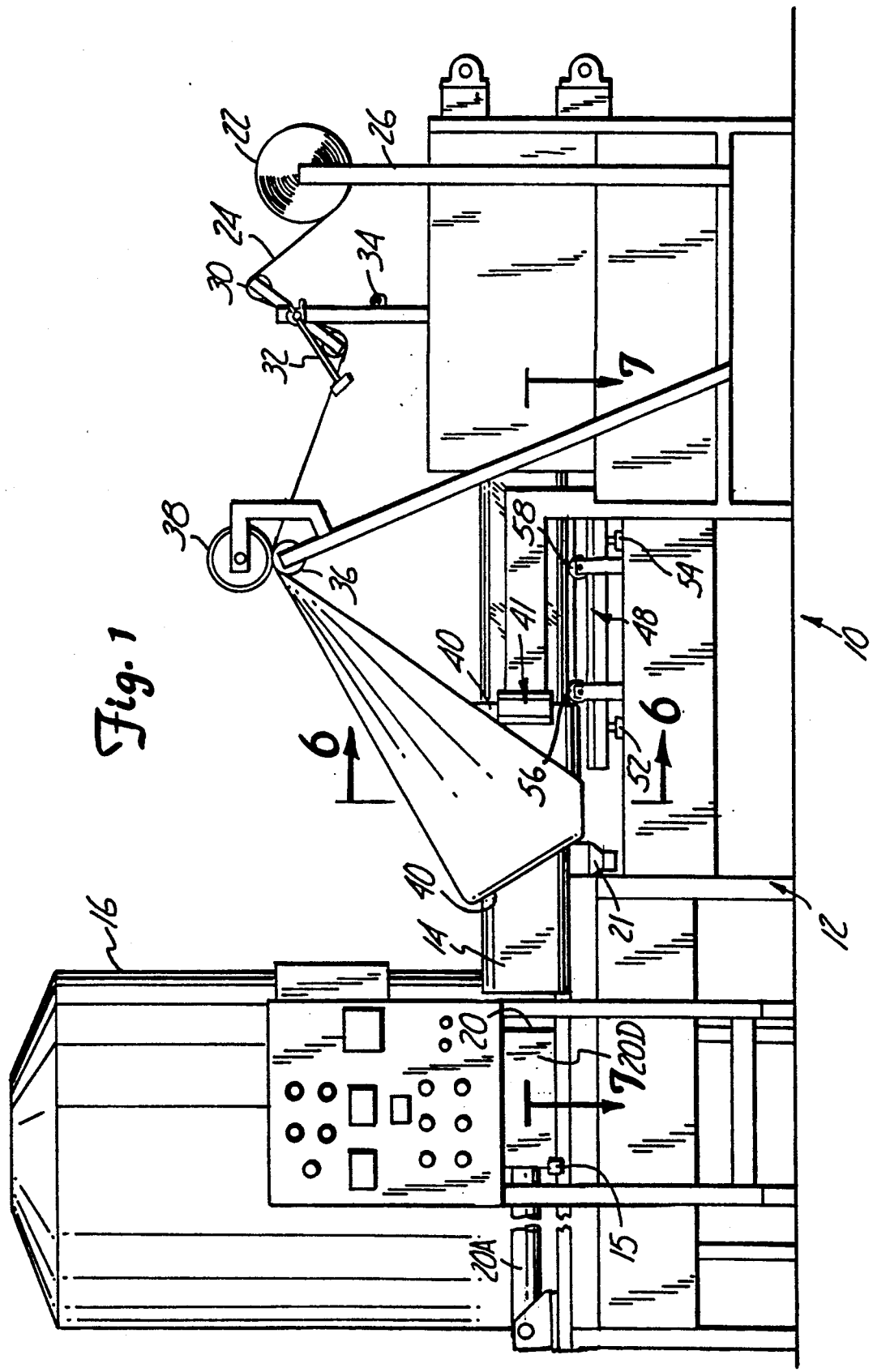
FIG. 1 is a side elevational view of the apparatus of the present invention.
Figure 2:
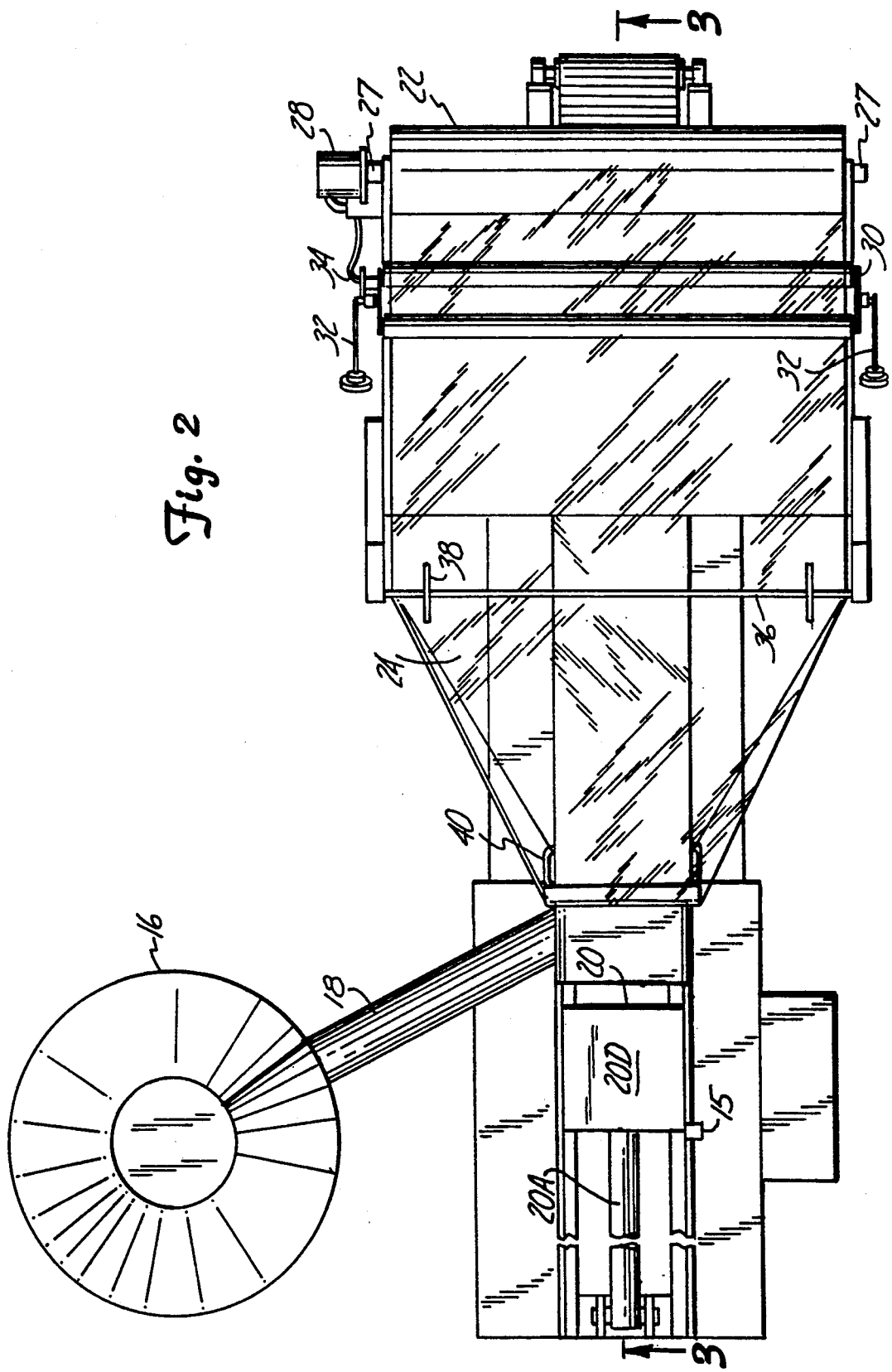
FIG. 2 is a top plan view of the apparatus of FIG. 1.
Figure 3:
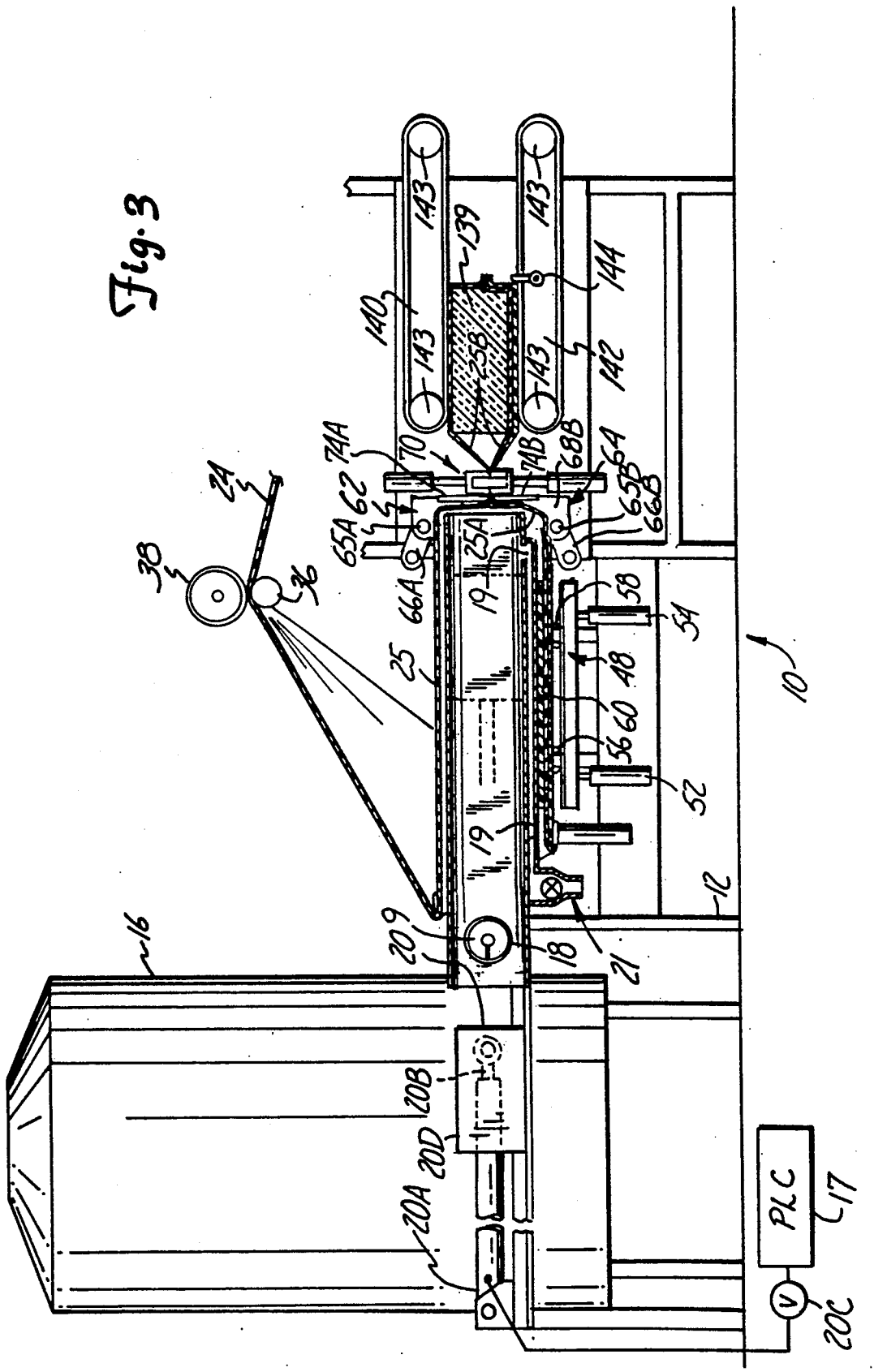
FIG. 3 is a sectional view along line 3—3 of FIG. 2.
Figure 4:
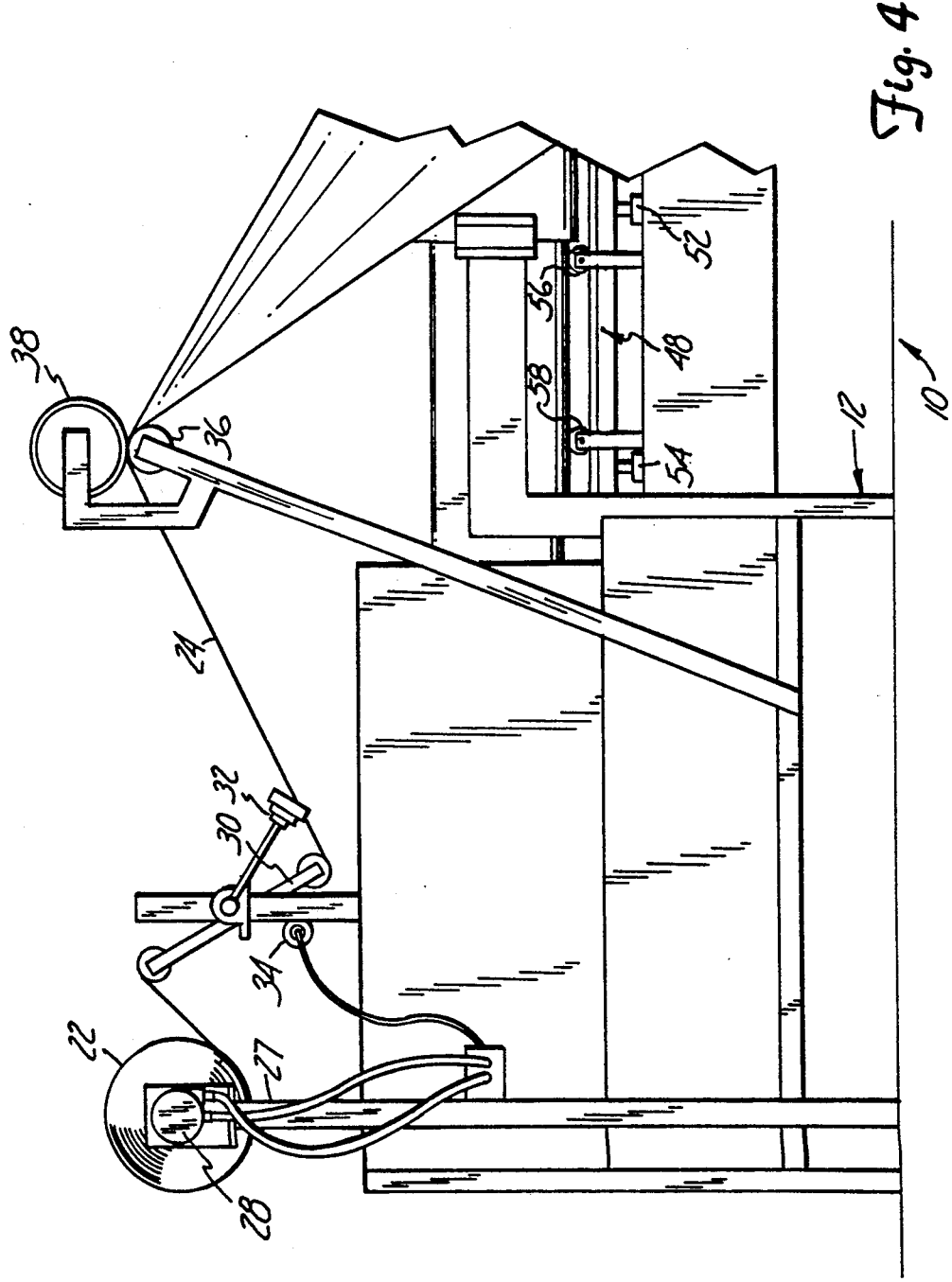
FIG. 4 is a partial side elevational view of the apparatus of FIG. 1.

Referring initially to FIGS. 1 through 3, an automatic, loose-fill insulation baler is shown generally at 10. A frame portion 12 supports, stabilizes, and secures the autobaler 10 to a supporting surface. A compression chamber, or baler tube 14, is mounted horizontally, and is supported by the frame portion 12. The bale tube 14 is where loose fibrous material is compacted into an insulation bale or billet.

A storage tank 16 stores loose fibrous material. The specific insulation being processed in the preferred embodiment is cellulose fiber, formed by disintegrated newspaper and treated with flame retardant chemicals. A passageway or chute 18 connects storage tank 16 to bale tube 14 for transferring the insulation from the tank 16 to the interior of the bale tube 14. An auger 9 which is shown at the junction of the bale tube 14 and the chute 18 moves the insulation from the storage tank 16 to the bale tube 14.

A hydraulic actuator 20A is mounted to the frame 12, and drives a piston 20 via a connecting rod 20B. The piston 20 is covered by a protective skirt 20D. The piston 20 and skirt 20D are shown in both their retracted position and their extended position (in dashed lines) in FIG. 3. The piston 20 and skirt 20D slidably fit into the bale tube 14 when the rod 20B is extended by the actuator 20A to compress the fibrous material into a bale or billet. The actuator 20A is controlled through a hydraulic valve 20C by a programmable logic controller (PLC) 17 which controls the actuator 20A and thus the direction of movement of the rod 20B as well as its speed. The PLC 17 controls the timing and function of the entire automatic baling sequence.

A pause switch 15 is located outside and before the bale tube 14, mounted to the frame 12. The pause switch 15 is a proximity switch that senses the presence of metal, which the skirt 20D is made from. When the skirt 20D is no longer sensed by the switch 15, the switch 15 is triggered causing the piston 20 to halt its compression stroke momentarily. This pause in the compression stroke allows the PLC 17 time to initiate other necessary functions. An exhaust air passage 19 opens to a second end of the bale tube 14, remote from the piston 20 as can be seen in FIG. 3, and runs adjacent to the bale tube 14 along a lower side thereof. A blower fan, shown generally at 21, runs continuously during baling operations and exhaust air from the passage 19 to draw particles and air from the bale tube 14 so that foreign particles and air are removed and a good strong bag seal can be made.

A supply roll 22 of plastic, preferably polyethylene (poly) film sheet, is supported by supply roll frame posts 26 and 27 at the end of the baler 10, opposite the storage tank 16. This supply roll 22 of polyethylene is to feed continuously a sheet or web 24 to the exterior of the bale tube 14. The web 24 is then wrapped over the tube 14 and formed into a continuous poly tube 25 by sealing the overlapping edges of the sheet on a lower surface of the bale tube 14. In the preferred embodiment the supply roll 22 is 57 inches wide and up to 12 inches in diameter. Mounting the supply roll 22 on the end of baler, as seen, facilitates roll reloading with the use of a forklift or other suitable means.

Referring to FIG. 2, a hydraulic motor 28 is mounted to the supply roll frame post 27 and is drivably coupled to the supply roll 22 to aid in unwrapping the thin film 24 or sheeting of poly. A sheet tensioner 30 is mounted between the supply roll 22 and the bale tube 14. A counter weight 32 and a proximity switch 34 are also mounted near the tensioner 30. The tensioner 30 maintains tension in the poly sheet or web 24 in order to prevent sagging and folding. The thin poly sheet 24 then travels to an index roller 36. The index roller 36 is equipped with guide wheels 38 which force the edges of the poly sheet 24 outward, preventing the sheet from creeping to the center of the roller 36 and bunching up. The guide wheels 38 accomplish this because their axes are angled 2 to 15 degrees relative to the roller 36 axis in a direction to urge the edge of the sheet 24 outwardly.

Figure 5:
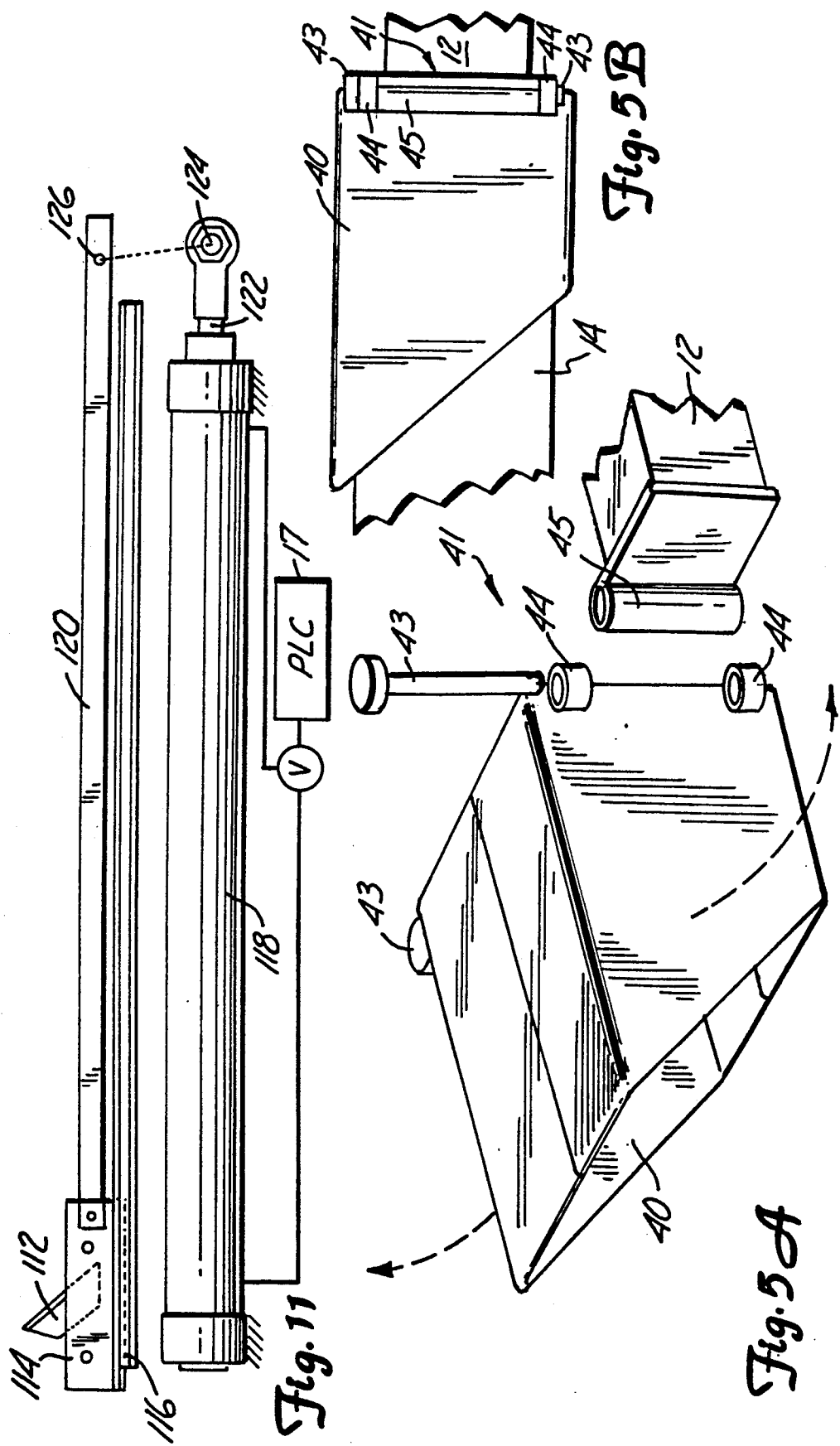
FIG. 5A is an enlarged perspective view of the plastic tube forming doors and hinges.
FIG. 5B is an enlarged side view of the plastic tube forming doors.

The poly sheet 24 next travels to poly tube forming doors 40 which are movably mounted adjacent to the base tube 14. The forming doors 40 are each made into halves, having hinges shown generally at 41 on the sides of the bale tube 14, as is seen in FIGS. 1, 5A and 5B. Each hinge 41 comprises a pivot pin 43 that slidably connects knuckles 44 and a barrel 45. Knuckles 44 are carried on the poly tube forming doors 40 and the barrels 45 are mounted to the frame portion 12. The poly tube forming doors 40 are hinged to ease installation of a new poly sheet 24, as the doors 40 can be opened and the poly sheet 24 placed under then and around the bale forming tube 14. When closed, forming doors 40 wrap around the outer perimeter of the bale tube 14. The poly sheet 24 feeds in from the inlet or infeed edges of the poly tue forming doors 40 and extends to an outlet end of the bale tube 14. The door edges are curved and shaped to guide the poly sheet 24 from a flat sheet at roller 36 easily and smoothly under the doors 40, which act to form and wrap the poly sheet 24 around the exterior of bale tube 14 as illustrated in FIG. 1.

Figure 6:
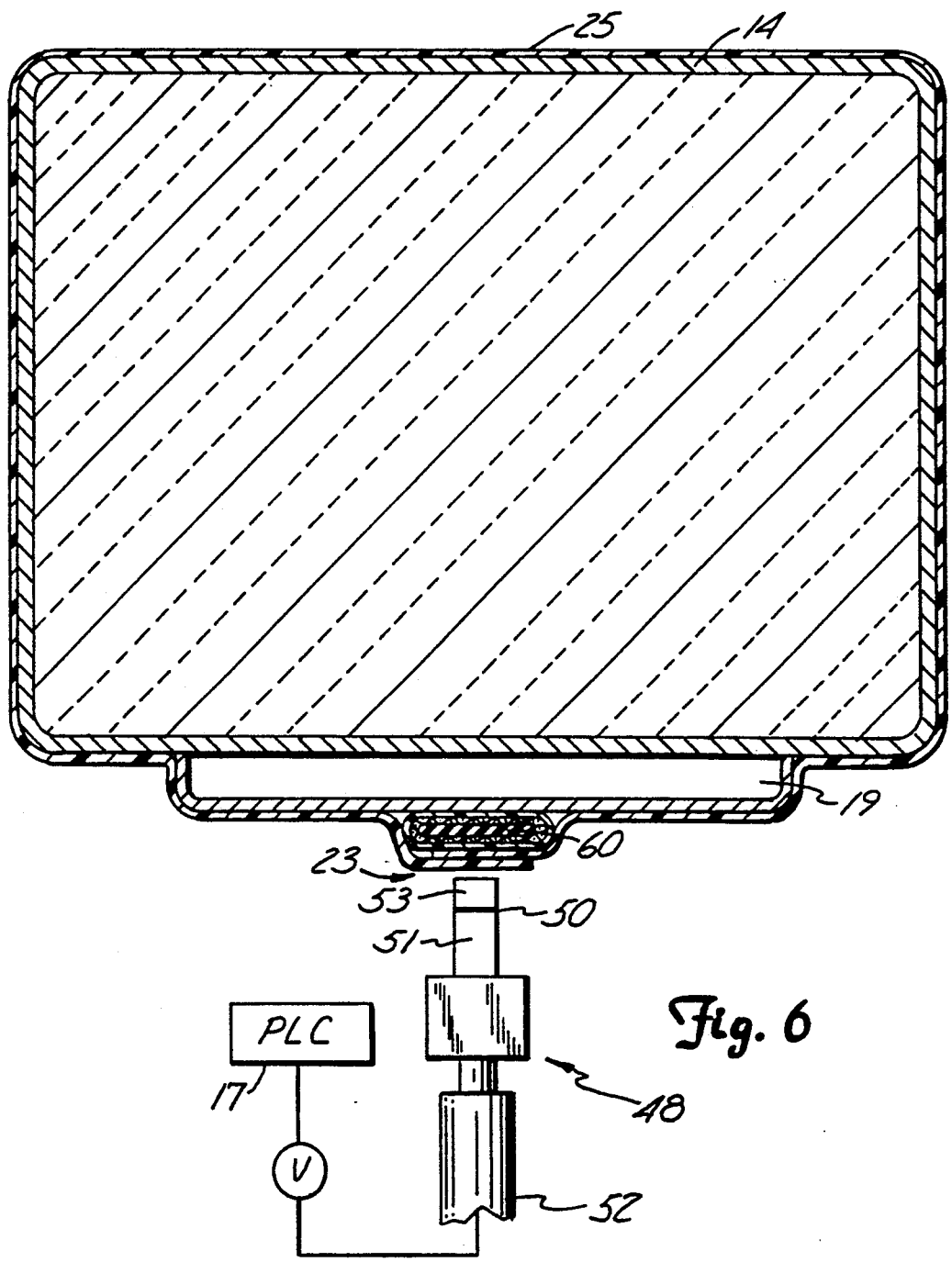
FIG. 6 is an enlarged sectional view taken along line 6—6 of FIG. 1.
Figure 7:
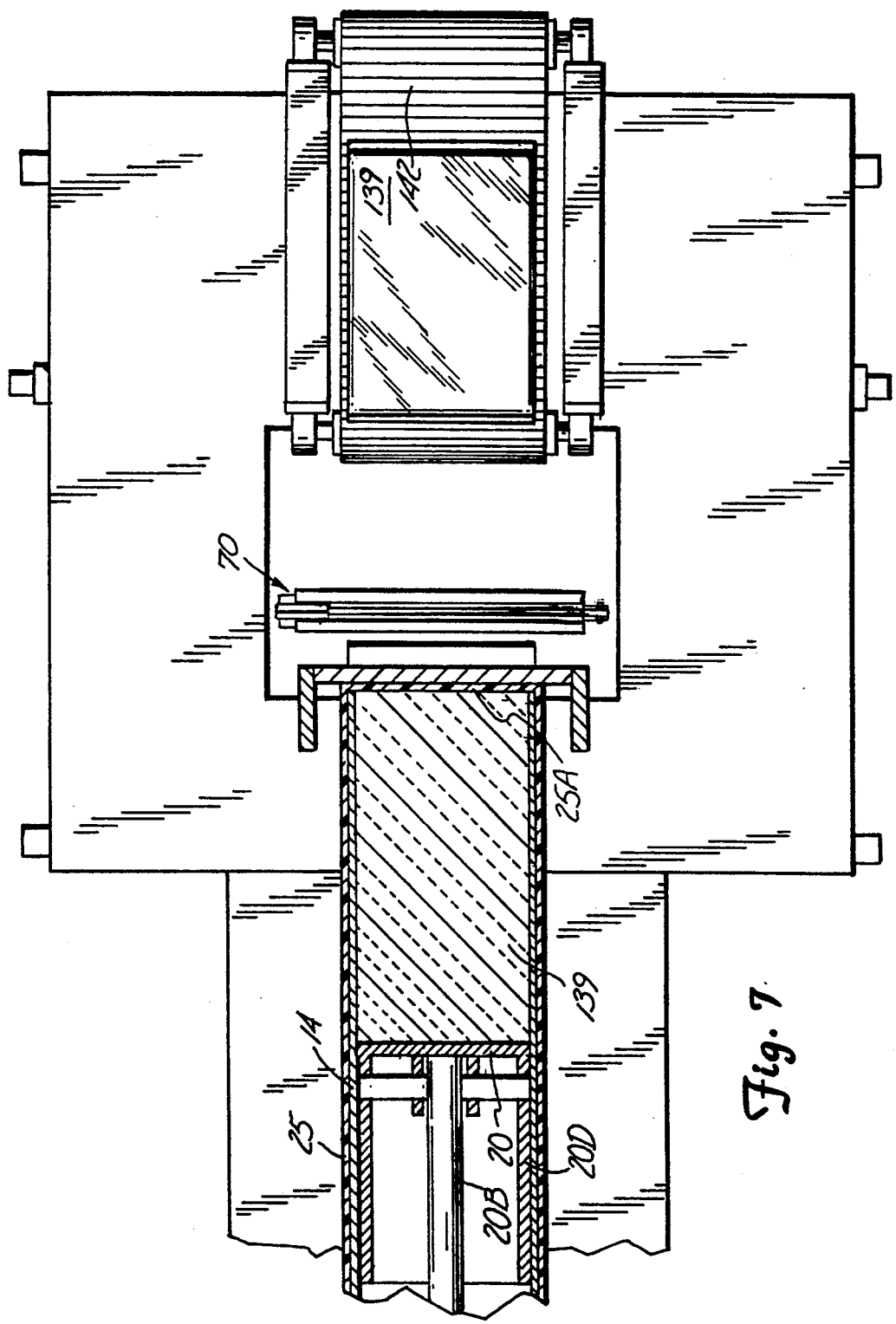
FIG. 7 is a partial sectional view taken along line 7—7 of FIG. 1.

Referring to FIG. 6, the poly sheet 24 is then formed in the shape of a tube with an overlap 23 of its longitudinal edges on the underside of the bale tube 14 on the portion extending to the outlet end of bale tube 14. The overlap 23 is used to form a closure seam. This overlap 23 must be sealed, or welded, to produce the continuous poly tube 25.

A block heater assembly for heat sealing the overlapping edges of the sheet 24 to form a long seam is indicated generally at 48 and is located directly below the bale tube 14 and adjacent to but spaced from the bottom of the poly tube forming doors 40 as illustrated in FIG. 1. As seen best in FIG. 6, block heater assembly 48 has a heating element 50, a support member 51, and a main heat block 53 that are raised and lowered by powered operators, as shown in FIG. 1, pneumatic cylinders 52 and 54. Two sets of guide wheels 56 and 58 are also located beneath bale tube 14. Each set of guide wheels 56 and 58 contains two wheels. Guide wheel sets 56 and 58 are located under the bale tube 14 to aid in holding the overlap edges in position to form the bottom seam and keep the poly sheet 24 edges wrapped closely (but slidably) to the bale tube 14. Guide wheel sets 56 and 58 are angled 2 to 15 degrees inward (toward the center plane of tube 14) to force the edges of the poly sheet 24 toward each other and to overlap as at 23. As can be seen in FIG. 3 and FIG. 6, a teflon coated silicone rubber backup pad 60 is fixed on the underside of the bale tube 14 to prevent the poly sheet 24 from sticking the bale tube 14 when the poly sheet 24 is heated to form the seam, which closes sheet 24 to form poly tube 25.

The heater block 53 is operated cyclically to seal a defined length of the overlapped edges on each operational cycle, as controlled by valves operated by PLC 17. The heat sealing takes place while the poly tube 25 is not moving and before the compressed bale is ejected from the bale tube 14. The heater assembly 48 is moved up while the bale tube doors (to be described) are closed and piston 20 is operating. The seam on overlap 23 is completed and the heater 48 retracted before the bale tube doors open and the bale or billet of material is ejected. Ejection of the bale from bale tube 14 causes the poly tube 25 to be advanced along the bale tube 14. The length of the heater block 53 is selected to be a little more than the length of poly tube advanced.

Also seen in FIG. 3, upper and lower bale tube end closure doors 62 and 64 respectively, are mounted adjacent to the outlet end of bale tube 14. The upper bale tube door 62 has upper support arm 68A that is drivably coupled to a shaft 65A is mounted on suitable pivots connected to the machine frame 12. The upper bale tube door 62 has a door panel 74A carried on support arm 68A which covers the upper half of the outlet opening of bale tube 14.

The lower door 64 has lower support arm 68B drivably coupled to a shaft 65B which is driven by an actuator arm 66B. Shaft 65B is also supported on suitable pivots connected to the machine frame 12. The support arm 68B carries a door panel 74B which covers the lower half of the outlet opening of bale tube 14. The poly tube 25 is held between the adjacent edges of the door panels 74A and 74B, and thus, is folded toward the center line of the bale tube 14 to form an end panel 25A of the poly tube 25, which will be the leading end of a bale overwrapping a bag.

Figure 8:
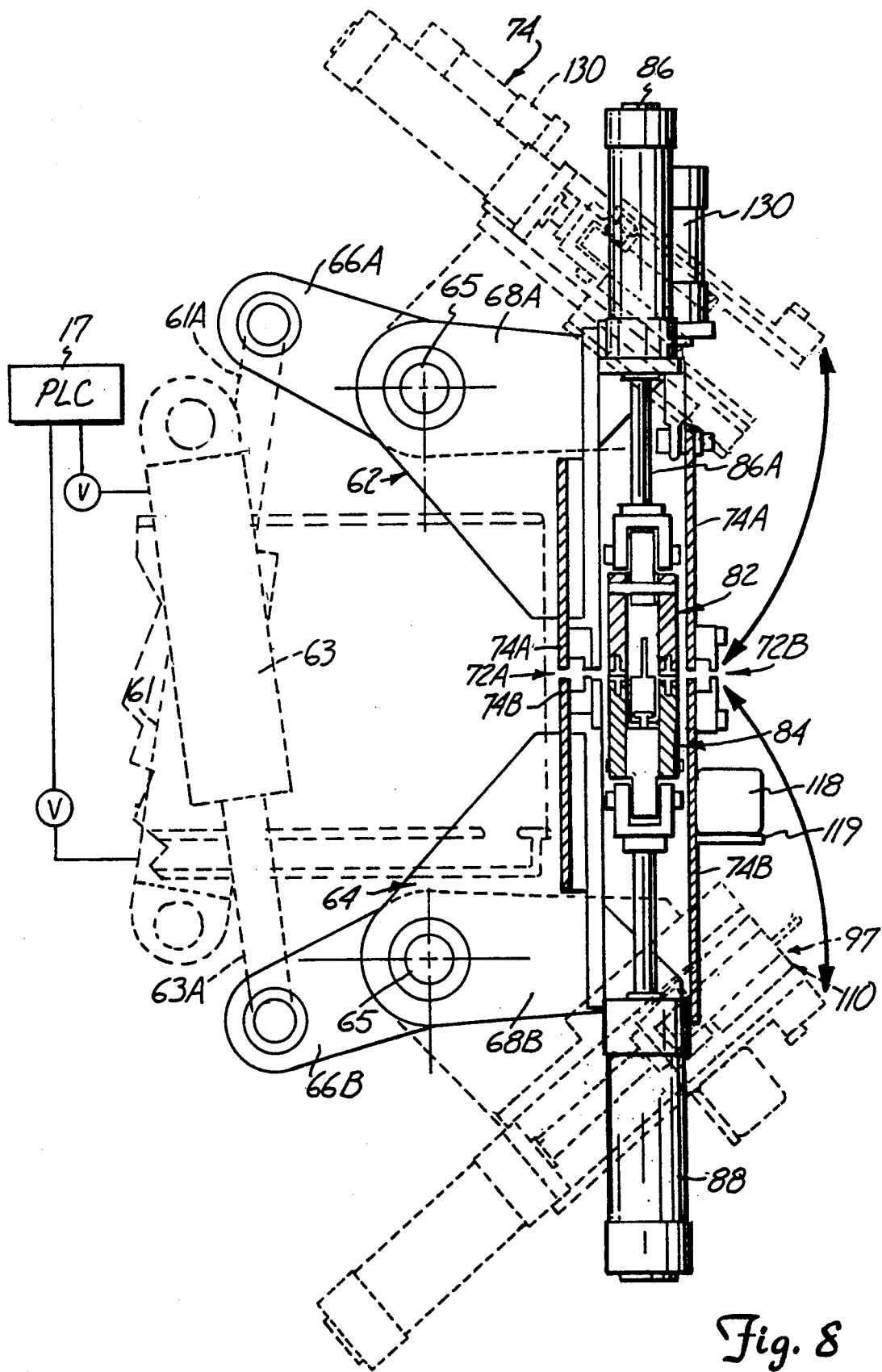
FIG. 8 is an enlarged sectional view of the heat, seal, and cut assembly.

Referring to FIG. 8, drive cylinders 61 and 63 open and close the doors 62 an 64, respectively. Drive cylinder 61 is mounted to the frame portion 12, and has a piston rod 61A which is connected to the upper arm 66A to operate door 62. Drive cylinder 63 is mounted to the frame 12 and has a piston rod 63A connected to the lower support member 66B on the opposite side of the bale tube 14 from drive cylinder 61. The drive cylinders 61 and 63 are controlled through suitable valves by PLC 17 to open and close the bale tube doors 62 and 64 at proper times.

When the doors 62 and 64 are in their closed position, as seen in FIG. 3, the support members 68A and 68B and door panels 74A and 74B move the upper and lower walls of the poly tube 25 together to fold across the outlet end of the bale tube 14 toward a center line and form end panel 25A. The door panels 74A and 74B cover the outlet end of the bale tube 14 to react forces from piston 20 for compressing insulation, and to give support to the end wall 25A formed on the poly tube 25 to prevent the poly sheet from bursting while the piston 20 compresses insulation into the partially formed overwrap or bag.

Figure 9:
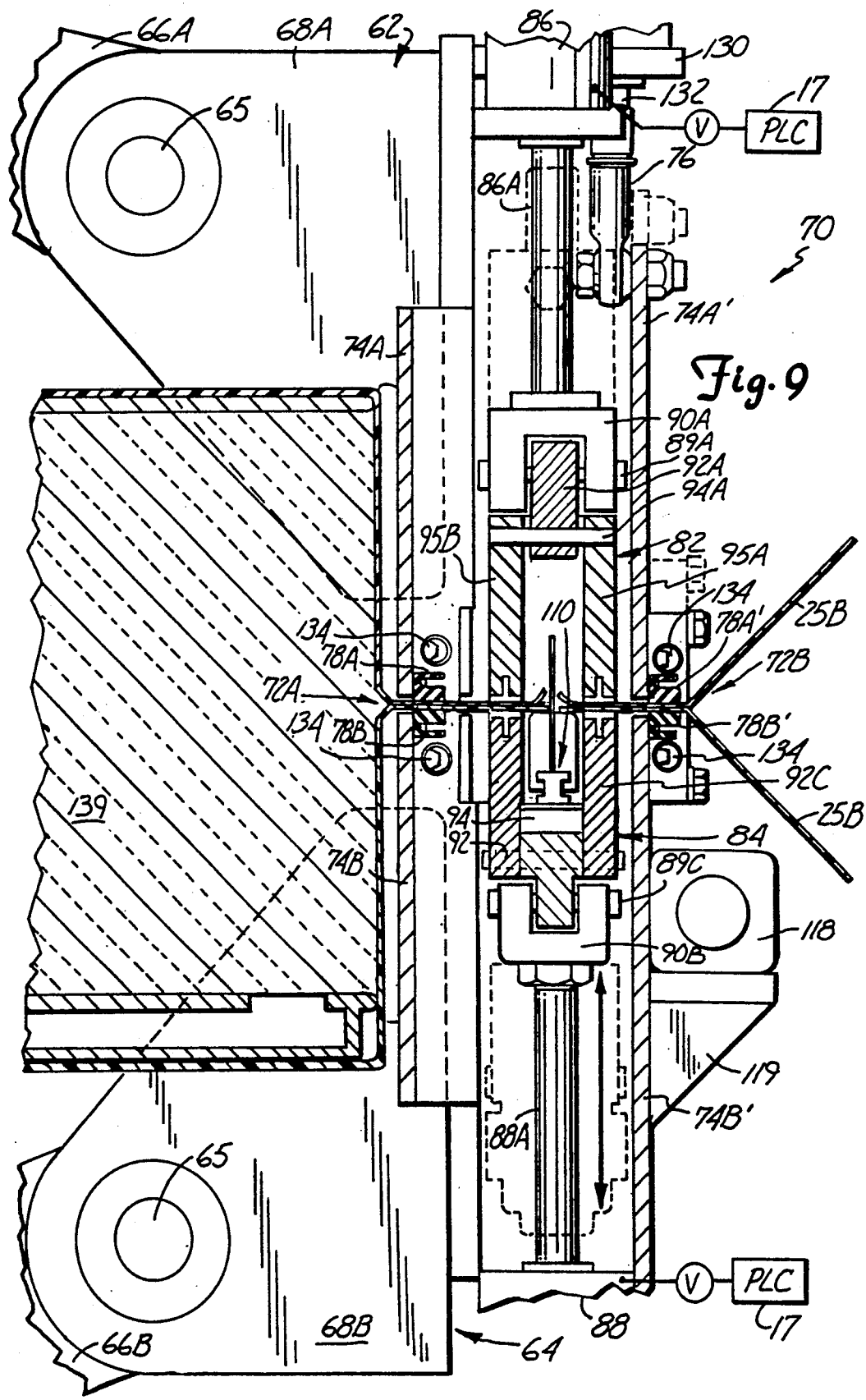
FIG. 9 is an enlarged detail of a portion of FIG. 8.

A clamp, cut, and heat seal assembly shown generally at 70 in FIG. 9 is mounted to the upper and lower support members 68A and 68B of the bale tube doors 62 and 64 on the exterior of the bale tube 14 and between the panels 74A, 74B and bale transport conveyors 140 and 142. Reference will be made to FIGS. 8, 9, 10 and 11 which show assembly 70 in more detail.

Once a bale or billet of compacted insulation has been formed in the tube 14 by action of piston 20, the bale tube doors 62 and 64 are opened through drive cylinders 61 and 63 by operating their respective valves in response to signals from PLC 17. A compressed bale is then ejected from the bale tube 14 by further movement of piston 20 outwardly. The compacted billet is forced beyond the path of the bale tube doors 62 and 64 onto conveyors 140 and 142.

The movement of the compacted billet causes the sealed poly tube 25 to be pulled outwardly with the billet because of sealed end panel 25A. At the same time, a new portion of web 24 is folded around bale tube 14 with overlapping edges 23 above the heater block 53. Slack in the poly tube 25 that surrounds the bale at the trailing end of the bale is created by reversing the bale or billet movement through the conveyors 140 and 142. The doors 62 and 64 are then closed without tearing the poly. As the doors 62 and 64 close, the end of the poly tube 25 surrounding the finished bale and the poly tube 25 around the bale tube 14 outlet end are folded together and are clamped and held at the center along the door edges of the door panels 74A and 74B. The clamping is accomplished between the edges of closed door 62 and 64, and between the upper and lower parts of assembly 70 so that the poly tube 25 is held to form an end panel 25B over the end of the newly formed bale of insulation positioned on the conveyors 140 and 142 and a new panel 25A over the open end of the bale tube 14. Folded end panel 25B will cover the end of the just finished bale of insulation after sealing.

Once the poly tube 25 is clamped by assembly 70, the tube 25 is then slit transversely. The clamped ends are then heat sealed along two transverse lines on opposite sides of the slit so that the poly tube 25 covering the finished bale of insulation is closed with a heat seal, and the new tube end panel 25A formed over the open end of the bale tube 14 is also heat sealed so that it will enclose a new bale of insulation.

Referring to FIG. 9, the assembly 70 includes a first end seal clamp for the poly tube 25 shown generally at 72A which is mounted to the upper and lower doors 62 and 64. The end seal clamp 72A includes an upper clamp bar 78A mounted to upper door panel 74A which is carried on the upper door support member 68A, and a lower clamp bar 78B carried on lower door panel 74B, which is carried on the lower door support member 68B. The upper and lower panels 74A and 74B are plates of metal or any other suitable plate material.

Upper clamp bar 78A is a transverse bar that protrudes slightly below the lower edge of upper door panel 74A. The lower clamp bar 78B is aligned along and slightly above the upper edge of door panel 74B in position to contact the upper clamp bar 78A when the doors 62 and 64 are closed. The camp bars 78A and 78B are rounded, and made of somewhat compliant material that deforms slightly to produce a good clamp on the poly tube 25, which is collapsed when the doors 62 and 64 are closed. Closing the bale tube doors 62 and 64 causes the end seal clamp 72A to be in a clamping position. A second end seal clamp 72B also clamps the poly tube 25 at a location spaced longitudinally from end seal clamp 72A when the bale tube doors 62 and 64 close.

A top and bottom heating means for heat sealing the poly tube 25 along a transverse line are shown generally at 2 and 84, respectively, and are also carried by the bale tube upper and lower doors 62 and 64. The heating means 82 and 84 are mounted between the first end seal clamp 72A and the second end seal clamp 72B. Top and bottom heating means 82 and 84 are for sealing or welding the poly tube 25 with first and second end seams. The heating means 82 and 84 each have two parallel heater rails which are spaced slightly in longitudinal direction of the poly tube 25. The slit to separate the overwrap on the ejected bale panel 25B from the new end panel 25A is made in between where the heat seals are made. A pair of top and bottom heater control cylinders 86 and 88 are mounted to the top and bottom bale tube door support members 68A and 68B and are actuated by suitable valves controlled by the PLC 17 to move the heating means 82 and 84 up and down by actuating pistons which move piston rods 86A and 88A.

Figure 10:
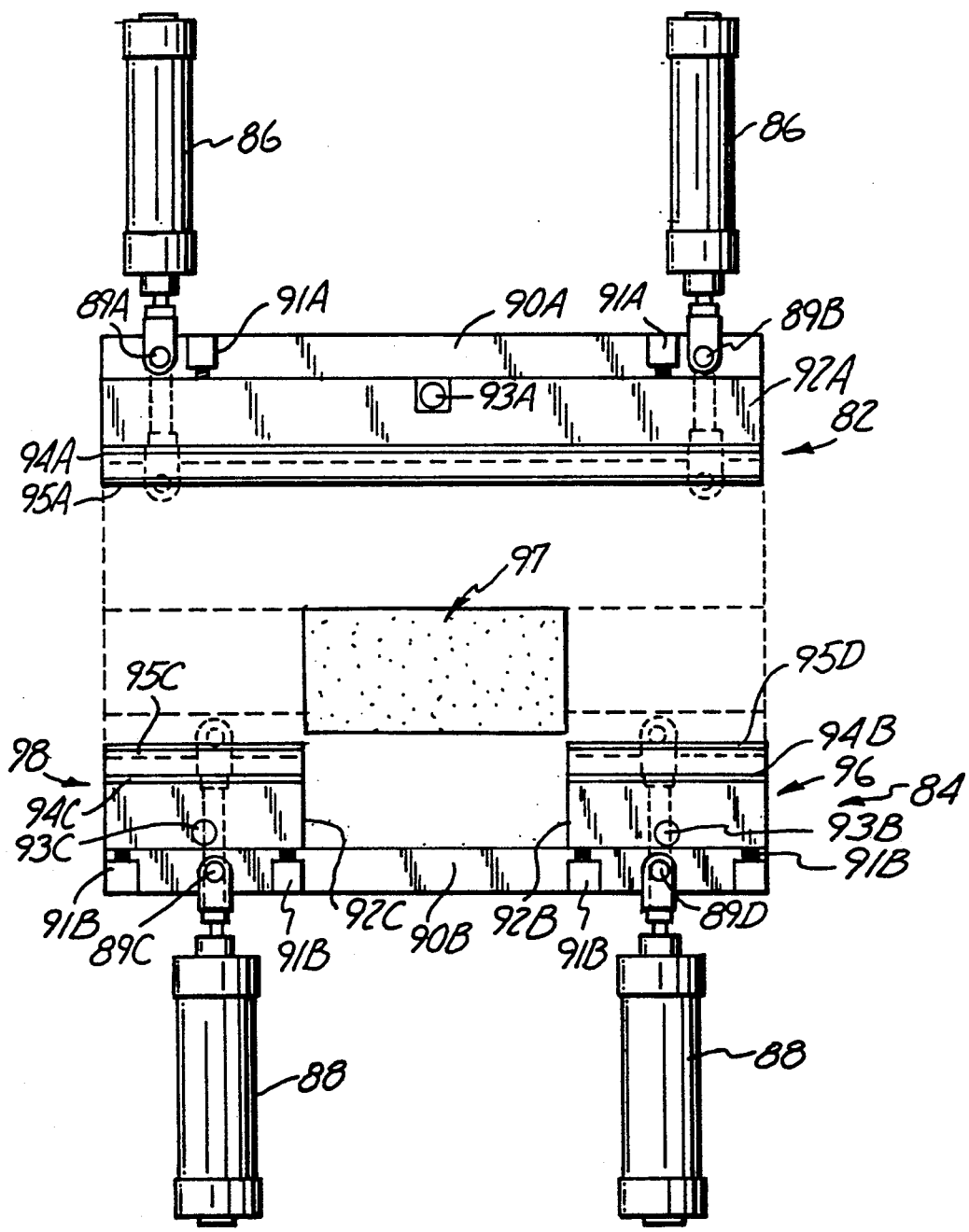
FIG. 10 is an end view of the top and bottom heating means.

Referring to FIGS. 9 and 10, the top heating means 82 is a U-shaped elongated iron that has parallel, spaced heating rails that run substantially the width of the bale tube 14. The top heating means 82 is U-shaped in order to create the first and second end seams. One end seam is a rear end seal for a finished bale wrap for panel 25B and the other end seam is a front end seal for a new bale wrap for panel 25A. Both seams are formed with a single actuation of the cylinders 86 and 88. Top heating means 82 comprises a top support member 90A, top leveling springs 91A, a top main block 92A, a top pivot 93A, a top heating element 94A, and top heating rails 95A and 95B. The top support member 90A is coupled to the top cylinders 86 (two cylinders spaced along the heating means are used), through coupling pins 89A and 89B, as is shown in FIG. 10. The top main block 92A is connected to the top support member 90A is coupled to leveling springs 91A. The leveling springs 91A allow the top heating means 82 to pivotally move slightly about pivot 93A, which is located in the top main block 92A. The pivot 93A allows the heating means 82 to pivot slightly to achieve a good seal. Top heating element 94A is mounted to top main block 92A. Heating element 94A is connected to a separate temperature controller that maintains the top heat rails 95A and 95B at a constant temperature of approximately 280° F.

Bottom heating means 84 has three sections placed end to end, and together the sections extend substantially width of the bale tube 14. The heating means 84 is aligned with the top heating means 82. A bottom support member 90B is coupled to the bottom cylinders 88 (two are used), through coupling pins 89C and 89D, as seen in FIG. 10. The three sections of the bottom heating means are shown at 96, 97, and 98. The outer end sections 96 and 98 are the same as, and function the same as the top heating means 82. The section 96 and 98 each have heating rails that align with the rails 95A and 95B of the top heating means. Outer sections 96 and 98 comprise bottom leveling springs 91B, bottom main blocks 92B and 92C, bottom pivots 93B and 93C, bottom heating elements 94B and 94C, and bottom heating rails 95C and 95D.

The middle section 97 of the bottom heating means 84 is a backing or building support and is made of a rubber material, with a teflon coated silicon rubber backup pad 98 to prevent the poly tube 25 from sticking during heating. The bottom heating means 84 is separated into three sections to also apply heat at the outer sides, only where it is needed because of multiple layers of poly caused by inward folding the tube 25 as the doors 62 and 64 are closed. In the middle where there are only two layers of sheeting and no overlapping of the poly tube 25, and no folds, the heat from the top heating means 82 is sufficient to seal the poly 24 while the poly tube is supported by section of the 97 and backup pads 98. There is one backup pad under each of the upper heating rails 95A and 95B. At the outer edges of the poly tube 25, gathering and folding occurs when the tube 25 is collapsed about a finished bale so several layers of poly are present, thus requiring more heat to properly seal the poly tube 25.

A cutter shown generally at 110 is mounted in the cavity between rails of the bottom heating means 96 and 98 and between backup pads 98 in the center section 97. The cutter 110 severs the poly tube 25, thus creating individual units or sleeves of overwrap for each bale of insulation. The cutter 110, as seen in FIG. 11, comprises a cut-off knife 112, a knife holder 114, and a cut-off knife guide rail 116. The cutter 110 also has a cut-off knife drive cylinder 118 and a cut-off knife draw bar 120. The cut-off knife drive cylinder 118 is mounted outside the heating means 84, and laterally offset to the outside of the second end seal clamp 72B, on a cylinder support block 119 (FIGS. 8 and 9). The drive cylinder 118 drives a piston rod 122 that has a rod end 124 which is laterally outward from the heater block 82 and is connected with suitable fastening means schematically shown in FIG. 11 with dotted lines. The cylinder 118 and the cutting means 110 travel with the lower door 64, staying in the same position relative to one another. The movement illustrated in FIG. 8 is exaggerated from that in actual use. The rod 122 extends and retracts in a direction parallel to the cut-off knife guide rail 116. The knife cylinder rod end 124 is connected by the fastening means, or link, to a hole 126 in the cut-off knife draw bar 120. When the cut-off knife drive cylinder 118 is actuated, the piston rod 122 moves a distance slightly greater than the width of the poly tube 25, pulling the cut-off knife 112 via the cut-off knife draw bar 120, and thus serving or slitting the poly tube 25.

The cylinder 118 is retracted to reset the knife 112 while the heater means 82 and 84 are operating and before a new bale is ejected from bale tube 14. The cylinder 118 is operated by a valve controlled by PLC 17.

A bracket, which is not shown, connects both the cutter 110 and the middle section 97 of the bottom heating means 84 to the lower plate 74B. The cutter 110 and the middle section 97 are not lowered with the outer end sections 96 and 98 by the piston 88. When the doors open, the cutter and the center portion are moved with the lower plate 74B, but not with the outer end sections 96 and 98 as can be seen in FIG. 8.

To move with the door supports 68A and 68B, a second end seal clamp cylinder 130 is fixedly mounted and forms part of the second clamp 72B. Second end seal clamp 72B has an upper plate 74A' which can be retracted as the bale tube doors 62 and 64 close and then moved down for final clamping against a lower plate 74B'. The plate 74A' is connected to a piston rod 132 which is driven by the clamp cylinder 130. The second end seal clamp 72B clamps and holds the poly tube 25 in place while the cutting, heating, and cooling function are taking place. The upper plate 74A' is moved between its clamping and retracted position by the clamp cylinder 130 and piston rod 132 which are controlled by a valve operated by signals from the PLC 17. Because the second end seal clamp 72B is carried by the upper and lower door support members 68A and 68B, the second end seal clamp 72B can only be in its clamping position when the upper and lower doors 62 and 64 are closed.

The upper plate 74A' is actuated when the doors first close and then moved down against the lower part 78B' after the doors 62 and 64 close to avoid wrinkling or tearing the plastic sheet. The lower panel 74B' does not retract or move. The second end seal clamp 72B is on the opposite side of the upper and lower heater assemblies 82 and 84 from the first end seal clamp 72A, and is constructed similar to the first end seal clamp 72A except for movable upper plate 74A'. As such, it is labeled with corresponding number with a "prime" designation.

A series of air jets 134 are mounted adjacent each of the first and second end seal clamps 72A and 72B. The air jets 134 are aimed toward the intersection of the top and bottom heating means 82 and 84 to cool the seam after welding.

Referring back to FIG. 3, after a bale, billet or package of insulation 139 leaves the bale tube 14 from operation of the cylinder 20A, which ejects the finished bale after the bale tube doors 62 and 64 are opened, the bale is moved between upper and lower conveyors 140 and 142, respectively, and remains stationary until the poly tube 25 is slit and sealed as just described. Upper and lower conveyors 140 and 142 are supported by the frame portion 12, and are driven by a reversible motor, not shown, that drives conveyor rollers 143. The conveyor paths of movement are parallel to the longitudinal axis of the bale tube 14. A trigger switch 144 is also mounted to the frame portion 12 in the path of bale travel. The trigger switch 144 is set to determine the finished bale length and position for stopping and slightly reversing the conveyors 140 and 142 for cutting and sealing the poly bag. The switch 144 sends a signal to PLC 17 which in turn controls the conveyor motors.

In operation, the autobaler 10 loads insulation into the bale tube 14 by an auger 9 from the storage tank 16. The auger is driven by a motor, not shown, under control of the PLC 17. As a starting point for purpose of explanation, the piston 20 is assumed fully retracted or at the "home position" and the bottom seam has been formed to form poly tube 25. It is also assumed that the seal at heater means 82 and 84 has been formed to form end panel 25A.

When the auger 9 has metered out the proper amount of insulation into the bale tube 14, the piston 20 begins its forward compression stroke. The piston 20 moves quite fast and compressed the insulation against bale tube doors 62 and 64 until the piston 20 passes the pause switch 15 which provides a signal to PLC 17. At this point, the piston travel is stopped by the PLC for approximately 1.5 to 2 seconds. After the pause the PLC 17 operates the valve to drive cylinders 61 and 63 to begin opening the bale tube door 62 and 64. With the bale tube doors 62 and 64 fully opened, the piston 20 again resumes forward travel to push the billet or bale of insulation 139 out of the bale tube 14 and onto the conveyors 140 and 142.

While the piston 20 is in its forward compression stroke, the exhaust fan 21 acting through air passage 19 is removing air and dust from inside the bale tube 14. Failure to allow a passage for the pressurized air to escape may result in rupture of the poly tube 25 while the insulation is being compressed. The passage 19 also helps to prevent leakage through the first end seal clamps 72A (which remain in place while the doors 62 and 64 are closed) by reducing the air pressure inside the poly tube 25. Leakage would allow the insulation to be blown out of the doors 62 and 64 and accumulate between the bale tube 14 and surrounding poly sheet 24 forming tube 25. This type of leakage interferes with sealing or welding of the seams of the poly sheet 24. A vacuum is produced by having the fan 21 connected to the air passage 19 which helps create a venturi effect as the bale doors 62 and 64 begin to close on the poly tube 25. The venturi effect helps to clean the area where the end seal will be make. This vacuum also helps in the tuck and fold of the ends of the poly tube 25 as it is compressed by the bale tube doors 62 and 64.

While forming the polyethylene sheet 24 into the continuous poly tube 25, as the bale 139 and poly tube 25 advance, the supply roll 22 unwraps or feeds the polyethylene sheet 24 with the aid of the supply roll hydraulic motor 28. The poly sheet 24 is fed through the tensioner 30 which is counterweighted by counterweight 32 to maintain tension in the sheet 24 in order to prevent sagging and folding. The tensioner 30 also controls the supply roll motor 28 by means of a proximity switch 34 which is monitored by the PLC 17. The normal position for the tensioner 30 is with the side frames vertical and when one roller is directly above the other. As poly sheet 24 is pulled, frame of the tensioner 30 moves away from the proximity switch 34, the switch 34 provides a signal to the PLC 17 which controls operation of motors 28 to begin unwinding the poly sheet 24 until the frame of tensioner 30 is again in the vertical position. The supply roll motor 28 is thus activated by the PLC 17 to unroll the poly sheet 24 until the frame of tensioner 30 again moves to a vertical plane or other selected position.

As the poly sheet leaves the tensioner 30 it next travels to the index roller 36. The index roller 36 positions the poly sheet 24 at the correct height and distance away from the poly tube forming doors 40. The index roller 36 and the guide wheels 38 force the edges of the poly film 24 outward preventing the film 24 from creeping to the center of the roller and bunching up.

The poly sheet 24 is formed into the poly tube 25 by the forming doors 40. The edges of the poly sheet 24 overlap at the bottom of the bale tube 14 and must be sealed or welded, as has been explained, to produce the continuous poly tube 25. The sealing is done by reciprocating the heater 53 at the proper time.

After the conveyors 140 and 142 have received the package 139 which comprises a bale of insulation covered with an overwrap of polyethylene having one sealed end, the conveyors 140 and 142 pull the package 139 and the poly tube 25 off the bale tube 14 until the leading end of the bale or package 139 trips the trigger switch 144, which is set to determine the finished bale position. When the trigger switch 144 is activated, the PLC 17 stops the conveyor motors and reverses the motors so the bale 139 is brought backwards a limited distance. The reverse direction movement moves the package 139 back toward the end of the bale tube 14 to create enough slack in the poly tube 25 so the ends of the poly tube 25 can be sealed. At this point, piston 20 is also reversing its direction and moves to the home position for its next cycle.

A partial vacuum is developed in the bale tube 14 and the continuous poly tube 25 due to the package 139 pulled from the end of the bale tube 14, the piston 20 returning to its home position, and the air passage 19 and the blower fan 21 removing air from the bale tube 14 and poly tube 25. This negative pressure combined with the slack in the poly tube 25 obtained by reversing the conveyors 140 and 142, creates a fold and tuck in the poly tube 25. This negative pressure combined with the slack in the poly tube 25 obtained by reversing the conveyors 140 and 142, creates a fold and tuck in the poly tube 25 at the seal location. This facilitates making the rear end seal of the bale 139 and the front end seal for a new bale by insuring that the entire width of the poly tube 25 is clamped and secured by the end clamps 72A and 72B. The vacuum effect, as already noted, also keeps the seal area clean so there is little contamination of the seal area due to entrapped insulation.

As the conveyors 140 and 142 reverse direction and the package 139 gets closer to the bale doors 62 and 64, the PLC 17 closes the baler doors 62 and 64 and activates the second end seal clamp cylinder 130 to pinch the poly tube 25 between the end seal clamps 72A and 72B. The cut off knife 112 is then activated to separate the package 139 from the end of the continuous poly tube 25. Because of the residual tension that exists in the poly film 24 even after it is secured by the spaced seal clamps 72A and 72B, the poly sheet 24 forming tube 25 must be cut before sealing. The tension that remains in the poly could cause a weak or broken seal if the tension is not removed first, since the poly sheet 24 becomes very weak when heated to the sealing temperature. Thus, even the small amount of residual tension remaining may be enough to break the seal if the tube 25 is not cut before sealing.

After the poly tube 25 has been severed, the top and bottom heater block cylinders 86 and 88 are activated through operation of valves by the PLC 17 causing the top and bottom heating means 82 and 84 to be brought together. The poly tube 25 is then welded to create the rear end seam of the bale 139 and a front end seam for a new package. After the ends of the poly tube 25 have been welded, the heating means 82 and 84 are retracted. The cooling jets 134 are then energized to speed the seam cooling, which allows the finished and sealed package 139 to be moved sooner.

While the end seams are being clamped, cut, and sealed, the transverse seam along the bottom of the bale tube 14 is being formed to make the continuous poly tube 25. The block heater assembly 48 is raised by cylinders 52 and 54 until the edges of the poly sheet 24 are pressed between the heater assembly 48 and the silicone rubber backup pad 60. The time of heating is controlled by the PLC 17. The cylinders 52 and 54 then retract the block heater assembly 48 and the seam is allowed to air cool. This seam is allowed to cool on its own without the aid of cooling jets because the tube remains stationary for a sufficient period of time.

The overall baling device then continue in a substantially continuous process. As soon as the piston 20 is retracted to its home position, material will be fed in by the conveyor into the bale tube 14, and this can start to occur even before the cooling jets 134 have cooled the end seams. The doors 62 and 64 will remain in place closed, so that the bale will be compressed against the solid backing of the door panels for compression. The conveyors 140 and 142 will be started as soon as the jets 134 have cooled the end seam and the clamp 74A has released the trailing edge of the completed bag. The conveyers 140 and 142 will continue to run until the bail is ejected from the bail tube 14. The conveyers 140 and 142 then stop briefly while the next bale is being compressed in the bale tube 14 and until the doors 62 and 64 open.

The heaters for the bottom seams, of course, can be retracted at the time the polyethylene is being pulled off the bale tube, to surround the bale formed by the piston 20. Thus the entire unit is timed together with the PLC 17, in a desired sequence, utilizing suitable switches or other indicators of the completion of a particular phase of the operation, or a position of a particular part that is critical to the operation.

The polyethylene sheet 24 is guided to form the tube 25 as shown in an easy manner, and the other components are timed satisfactorily for a substantially "batch" operation on a repeating basis.

A sequence of operations for the finished bale, which is controlled by the PLC 17 in summary form are as follows, with an understanding that some of the operations can be proceeding simultaneously. In other words, the packing piston 20 can be retracting at the same time that the sealing is occurring on the ends of the poly tube 25, and likewise the fibrous material can be filled into the bale tube 14 at the same time as the operations are finishing on the plastic sheet. Initial compression also can be occurring. It is assumed the overwrap sheet is in place and the leading end seal has been made, and the bale doors are closed.

Steps are:
(a) Filling the tube with fibrous insulation material.
(b) Compressing the fibrous material.
(c) Opening the bale tube doors and ejecting the compressed bale with the compression piston onto the conveyor.
(d) Creating a slack in the overwrap tube and sealing the overlapped longitudinal edges for the next overwrap.
(e) Clamping the tube transversely, and closing the bale doors.
(f) Retracting the piston.
(g) Slitting the poly tube transversely and sealing the lagging end of the newly created bale and the leading end of a bale tube be formed.
(h) Removing the bale with the overwrap sealed at both ends.
(i) Continuously removing air from the bale tube during the operations.

Although the present invention has been described with reference to preferred embodiments, workers skilled in the art will recognize that changes may be made in form and detail without departing from the spirit and scope of the invention.

What is claimed is:

1. A method for automatically compressing and packaging loose fibrous material including the steps of:
   providing a bale tube with moveable closures for covering an outlet end;
   providing compression means in the bale tube;
   providing fibrous material to the bale tube;
   providing a continuous supply of bale overwrap material to the bale tube;
   forcing the edges of the bale overwrap material outward;
   forming the baling material around the bale tube;
   sealing the baling material to form a continuous overwrap tube around the bale tube having one end sealed closed and supported by the moveable closures;
   compressing the fibrous material into said continuous tube;
   exhausting air remotely from the compression means while compressing the fibrous material;
   opening the bale tube moveable closures; and
   extending the compression means to eject a bale of compressed material from the bale tube and drawing the surrounded continuous tube of bale overwrap material from the bale tube to overwrap such bale; and
   conveying the compressed material a desired distance and thereafter clamping the continuous tube of overwrap material transversely to the direction of ejection of the bale and sealing the clamped material.

2. An apparatus for automatically compressing and packaging loose fiber material comprising:
   a frame;
   a tubular member supported by the frame;
   means to provide fibrous material to the tubular member;
   means to compress said fibrous material in the tubular member and into a bale and move a discharge end of the bale out of the tubular member after compression;
   means to package said compressed fibrous material in an overwrapping to form a wrapped bale, wherein the overwrapping is formed from a continuous roll of overwrapping material mounted to said frame; and means to continuously exhaust air from said tubular member, wherein the means for exhausting air comprises an outlet from the tubular member remote from the means to compress said fibrous material.

3. The apparatus as in claim 2 wherein the means to package said compressed fibrous material comprises, the continuous supply of overwrap material and a motor for driving the supply of overwrap, a tensioner with a counterweight acting on the overwrap material, a proximity switch, index rollers with guide wheels which are angled from 2 to 15 degrees outward relative to the index rollers to force the edges of the overwrap material outward preventing the overwrap material from creeping to the center of the index rollers, the overwrap material being wrapped over the exterior of the tubular member, means to form said overwrap material into a tubular shape around the tubular member, means to cut the tubular formed overwrap material in direction transverse to the direction of movement of the means to compress adjacent the discharge end and exteriorly of the tubular means, and means to seal said overwrap material in direction transverse to the direction of movement of the means to compress to enclose the bale of compressed fibrous material.

4. The apparatus as in claim 2 wherein the outlet for exhausting air is connected to a blower means.

5. The apparatus as in claim 2 wherein the means to compress is a hydraulic cylinder moving a piston with a solid skirt in the tubular member in a longitudinal direction.

6. An apparatus for automatically compressing and packaging loose fiber comprising a frame supporting a bale tube having a longitudinal axis, a store of fibrous material connected to the bale tube, a piston inside the bale tube to compress the fibrous material into a bale, and openable and closable bale tube doors at one end of the tube to give support during compression of the fibrous material, and further including:

means for providing sheet baling overwrap material to the bale tube;

means for forming the sheet baling overwrap material around the bale tube with longitudinal edges of the sheet overlapped and extending in direction of the longitudinal axis and extending through a separating line of the bale tube doors to an exterior of the bale tube doors when the bale tube doors are closed;

a first sealing member adjacent the bale tube supported by the frame to provide a seal on the overlapped longitudinal edges;

a first clamping member transverse to the longitudinal axis mounted adjacent to the bale tube doors and to the exterior of the bale tube doors;

second and third transversely extending sealing members adjacent to the first clamping member and space apart in the longitudinal direction;

cutting means between the second and third sealing members;

a second clamping member transverse to the longitudinal axis mounted adjacent to the second and third sealing members and on an opposite side thereof from the first clamping member;

conveying means supported by the frame adjacent to the second clamping member for supporting a bale and overwrapping when moved out of the bale tube in the longitudinal direction;

means for determining a position of a leading end of a bale moved out of the bale tube and carried on the conveying means and creating a slack in the overwrap; and means for sequencing the operation of at least portions of the apparatus to close the bale doors and clamp, slit and seal the overwrap after the slack is created and prior to compressing fibrous material in the bale tube.

7. The apparatus as in claim 6 wherein the baling overwrap material is a continuous roll of polyethylene sheet.

8. The apparatus as in claim 6 and further including means for exhausting air from the bale tube comprises an outlet from the bale tube connected to a blower means, said air being exhausted away from a sealing area.

9. The apparatus as in claim 6 wherein the first sealing member is a fluid actuated heating bar.

10. The apparatus as in claim 6 wherein a portion of the bale tube aligned with the first sealing member includes teflon coated silicon rubber to prevent sticking during heat sealing.

11. The apparatus as in claim 1 wherein the second and third sealing members are heating blocks and means to move said heating blocks toward and away from the overlapping edges.

12. The apparatus as in claim 6 wherein the cutting means is a slidable knife, and further including actuating means for sliding the knife in response to a control signal.

13. The apparatus as claimed in claim 11 and the cooling means adjacent the second and third sealing member comprising air jets blowing on the heat seals.

14. The apparatus as in claim 6 wherein the conveying means comprises a upper and lower conveyor belts spaced to receive a formed bale therebetween.

15. The apparatus as in claim 6 wherein the position determining means is a trigger switch.

16. The apparatus as in claim 6 wherein the means for sequencing the operation is a programmable logic controller.

17. The apparatus as in claim 6 wherein the means for providing the baling overwrap material includes a motor for driving the roll of polyethylene, a tensioner with a counter weight acting on the sheet, and a proximity switch to control the motor in response to slack in the polyethylene sheet.

* * * * *

UNITED STATES PATENT AND TRADEMARK OFFICE
CERTIFICATE OF CORRECTION

PATENT NO. : 5,226,269

DATED : July 13, 1993

INVENTOR(S) : Ronald F. Stoltenberg

It is certified that error appears in the above-indentified patent and that said Letters Patent is hereby corrected as shown below:

On the Title Page, in the [56] References Cited section, under U.S. PATENT DOCUMENTS, insert:

```
3,113,409   12/1963   Thurlings...............53/571
3,340,129    9/1967   Grevich.................156/498
3,699,742   10/1972   Giraudi.................53/375.3
4,054,018   10/1977   Neukom..................53/527
4,108,063    8/1978   Randolph................100/53
4,532,753    8/1985   Kovacs..................53/451
4,601,159    7/1986   Mugnai..................53/511
4,630,429   12/1986   Christine...............53/479
4,716,712    1/1988   Gill....................53/523
4,999,974    3/1991   Kovacs et al............53/434
```

UNITED STATES PATENT AND TRADEMARK OFFICE
CERTIFICATE OF CORRECTION

PATENT NO. : 5,226,269
DATED : July 13, 1993
INVENTOR(S) : Ronald F. Stoltenberg It is certified that error appears in the above-indentified patent and that said Letters Patent is hereby corrected as shown below:

Col. 13, line 9, delete "overwrap", insert --overwrap material--
Col. 13, delete lines 55-58, insert:
--second and third transversely extending sealing members
   adjacent to the first clamping member and spaced apart
   in the longitudinal direction;--

Col. 14, line 34, delete "claim 1", insert --claim 6--
Col. 14, lines 51-52, delete "controller", insert
--controller (PLC).--
Col. 14, line 53, delete "claim 6", insert --claim 7--

Signed and Sealed this

Eighth Day of February, 1994

BRUCE LEHMAN

Commissioner of Patents and Trademarks